United States Patent [19]

Hoffman

[11] Patent Number: 4,731,309
[45] Date of Patent: Mar. 15, 1988

[54] HIGH RATE AND HIGH ENERGY DENSITY CELL

[75] Inventor: Ronald J. Hoffman, Midland, Mich.

[73] Assignee: The Dow Chemical Company, Midland, Mich.

[21] Appl. No.: 2,541

[22] Filed: Jan. 12, 1987

Related U.S. Application Data

[63] Continuation-in-part of Ser. No. 744,828, Jun. 14, 1985, abandoned.

[51] Int. Cl.$^4$ .................. H01M 6/04; H01M 10/44
[52] U.S. Cl. .................. 429/188; 429/52; 429/118; 429/199
[58] Field of Search .................. 429/188, 199, 52, 118

[56] References Cited

U.S. PATENT DOCUMENTS

| | | | |
|---|---|---|---|
| 3,915,740 | 10/1975 | Eisenberg | 429/194 |
| 3,928,076 | 12/1975 | Moser | 429/199 |
| 4,142,028 | 2/1979 | Leger et al. | 429/194 |
| 4,366,214 | 12/1982 | Coetzer | 429/199 |

Primary Examiner—Brian E. Hearn
Assistant Examiner—Stephen J. Kalafut
Attorney, Agent, or Firm—Andrew E. Pierce

[57] ABSTRACT

An electric current producing primary electrochemical cell having an aqueous electrolyte, an alkaline earth metal anode, and a cathode capable of intercalating ions of the anode metal. The cell operates at an ambient temperature of about 20° C. to about 100° C. at a pH of about 1 to about 5 and exists in a dry (unactivated) state until needed. Activation is initiated by the addition of the electrolyte.

14 Claims, 2 Drawing Figures

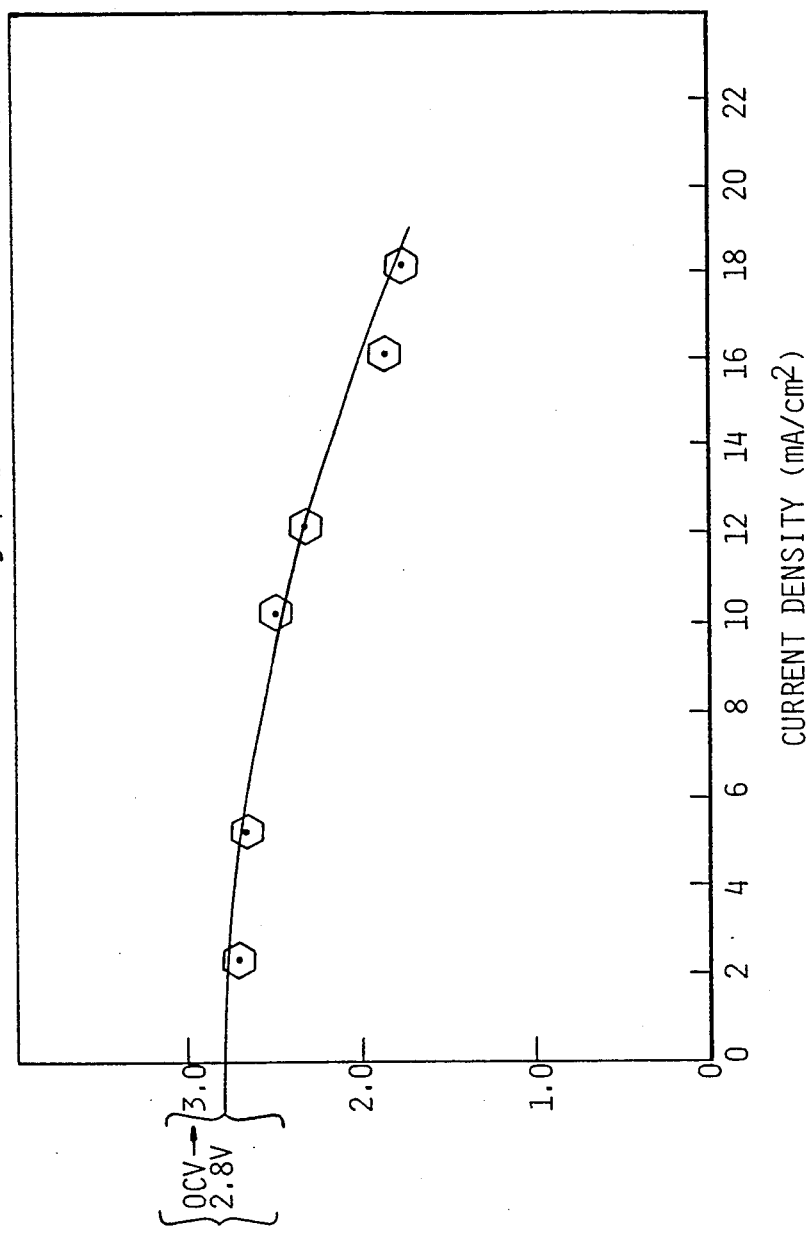

HIGH RATE AND HIGH ENERGY DENSITY CELL

CROSS REFERENCE TO RELATED APPLICATION

This is a continuation in part of application Ser. No. 744,828, filed June 14, 1985, now abandoned.

BACKGROUND OF THE INVENTION

1. Field of the Invention

This invention relates to primary electrochemical cells having an aqueous electrolyte and a cathode capable of intercalating the anode metal ions.

2. Description of the Prior Art

Alkaline earth metal anodes and aluminum anodes, when employed in electrochemical cells having an aqueous electrolyte at a pH close to neutrality, react very slowly due to a strong passivation layer or film which is formed on the anode surface. This film prevents the electrolyte from reacting with the anode to continue cell operation. It is therefore common practice to saturate an electrolyte solution with lithium chromate which acts as an inhibitor of the formation of the passivation film. The oxidizing effect of lithium chromate provides a film on the anode metal of sufficient porosity to maintain the electrolyte penetration to the anode metal and therefore cell performance is not inhibited by the formation of the usual passivation film on the anode. In U.S. Pat. No. 3,928,076 to Moser, the addition of lithium chloride to an aqueous electrolyte is disclosed as a means of inhibiting the formation of a passivation film or layer on a magnesium anode in contact with an aqueous electrolyte.

Various nonaqueous electrolyte electrochemical cells are disclosed in the prior art having cathodes which are capable of intercalation of an ionized form of the anode metal. U.S. Pat. No. 4,366,215, Coetzer et al, is representative. The insertion of alkali or alkaline earth metal ions into the cathode structure is disclosed in column 12.

There is no suggestion in the prior art that electrochemical cells having aqueous electrolytes and an alkaline earth metal anode will provide a high energy density/high rate primary battery wherein the alkaline earth metal ion of the anode intercalates the cathode structure during the electrochemical reaction to produce an electric current.

It is an object of the invention to provide a high rate, high energy density alkaline earth metal primary electrochemical cell comparable in energy and power density with the lithium/thionylchloride primary cells currently in use. The prior art lithium/thionylchloride cells have excellent energy and power densities but such cells exhibit severe toxicity hazards associated with handling the cells because of the hazardous electrolyte.

Another object of the invention is to provide a process for producing electric current in a high rate, high energy density alkaline earth metal primary cell which overcomes the severe handling and toxicity problems associated with the lithium/thionylchloride electrolyte primary cells of the prior art. The lithium/thionylchloride primary cells currently in use are relatively capacity limited because this cell couples its electrochemistry with a liquid cathode (thionylchloride).

SUMMARY OF THE INVENTION

There is disclosed a primary electrochemical cell having an aqueous electrolyte maintained at a pH of about 1 to 5, an alkaline earth metal anode and a cathode capable of intercalating an ionized form of said alkaline earth metal. The cell is operated at ambient temperature of about 20° C. to about 100° C. The primary cell of the invention exists in a dry or unactivated state until needed; activation being initiated by the addition of electrolyte. The cell is characterized as a high rate, high energy density cell which is comparable in energy and power density with lithium/thionylchloride electrolyte primary cells currently in use. The cathode of the cell is capable of intercalating the ionized form of the alkaline earth metal anode and the electrolyte is characterized as being inert relative to the cathode but allowing migration of anode ions between the anode and the cathode.

BRIEF DESCRIPTION OF THE DRAWING

In FIG. 2, the range of current density and open circuit voltage is shown for one embodiment of the electrochemical cell of the invention utilizing a cathode of $Co_3O_4$ and an electrolyte of magnesium tetrafluoroborate dissolved in water.

DETAILED DESCRIPTION OF THE INVENTION AND THE PREFERRED EMBODIMENTS

Figure 1:
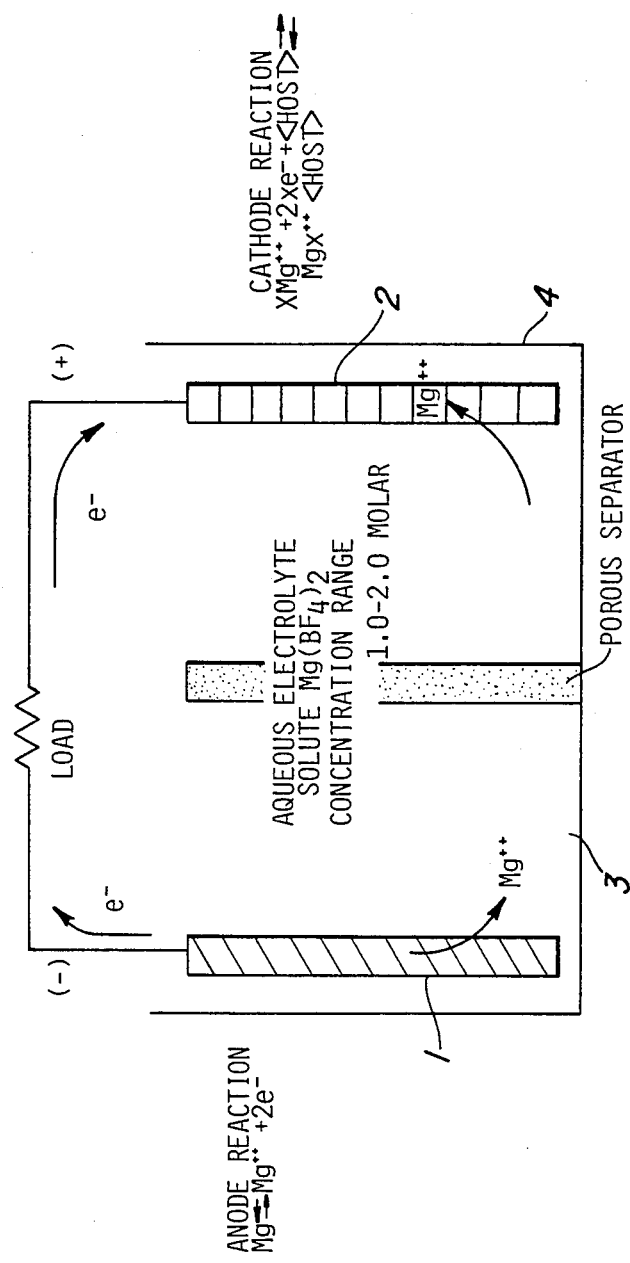
In FIG. 1 there is shown one embodiment of the invention in which the anode is magnesium and the cathode is a solid material capable of intercalating magnesium ions. In the cell of FIG. 1, the magnesium negative electrode is oxidized to produce magnesium ions which diffuse into the electrolyte, for instance, magnesium tetrafluoroborate, and said ions become available for insertion into the cathode. The cathode can be composed of a transition metal chalcogenide selected from the group consisting of $Co_3O_4$, $WS_2$, $ZrS_2$, $MoSi_2$, and $Mn_3O_4$ or a metal boride wherein the metal is selected from the group consisting of metals of Groups IV, V, and VI of the Periodic Table of the Elements and wherein the boron to metal mole ratio is greater than about 1.8.

According to the present invention, there is provided an electric current producing primary electrochemical cell containing an aqueous electrolyte in which an ionizable salt is dissolved, an alkaline earth metal anode, and a cathode in which the ionized form of the anode metal can be inserted within the structure of the cathode. The electrolyte is capable of dissolving the anode to form metal ions and provides a means of migration of said ions between the anode and the cathode.

With the ejection or solubilization of an anode ion, it is simultaneously absorbed into the surface of the cathode. This absorption or intercalation maintains electrical neutrality against the cathodic current at the electrode. The cathode reduction is accomplished by electron transfer to the solid, with the anode ions intercalating to maintain charge balance and thus act to change the oxidation state of the transition metal. When the concentration of anode ions in the cathode increases, a proportional decrease in the oxidation state of the cathode takes place. A significant aspect of the invention is the alteration of the oxidation state of the cathode by the insertion of the anode ions into the surface of the cathode.

Referring to FIG. 1, one embodiment of the electric current producing cell of the invention is shown. In FIG. 1, anode 1 is of magnesium, cathode 2 is a material capable of absorbing alkaline earth metal ions which pass from anode 1 to cathode 2 through an aqueous electrolyte in which magnesium tetrafluoroborate is dissolved at a concentration of about 1 to 2 molar. The cell is enclosed in a container 4 and operates upon filling the cell with electrolyte, spontaneously delivering electrical energy upon activation by a load connected across the terminals of the cell. The chemical reactions providing this energy are the oxidation of magnesium at the negative electrode, and the reduction of the cathode compound at the positive electrode.

Referring now to FIG. 2, there are shown test results for a primary cell of the invention having a magnesium anode, a $Co_3O_4$ cathode, and an aqueous electrolyte containing magnesium tetrafluoroborate dissolved therein at a concentration of about 1.0 to 2.0 molar. The curve of FIG. 2 illustrates the range of current densities and the open circuit voltage for this embodiment of the electrochemical cell of the invention. At a current density of 0, the open circuit voltage (OCV) is 2.8. This embodiment of the cell of the invention has a capacity of 225 milliampere hours per gram of cathode material. The primary cell of the invention has an energy density which is approximately twice the energy density of existing primary cells using aluminum and magnesium as the anode. In addition, as can be seen from the graph of FIG. 2, the primary cell of the invention will support current densities ranging from 0 to greater than 20 milliamps per square centimeter. A most important difference between the electrochemical cell of the invention and those cells of the prior art having an aluminum anode is that the cells of the invention have twice the capacity for the same weight as the prior art primary cells using aluminum as the anode material. These characteristics set the invention apart from conventional primary cells and place the cell of the invention in the category of advanced system cells like the lithium thionylchloride electrolyte cells of the prior art. The latter electrochemical cells are capable of energy densities ranging up to 60 watt hours per pound. The primary cells of the invention have no less capacity than the lithium thionylchloride electrolyte cells as the result of the electrochemical coupling of the alkaline earth metal anodes with a transition metal cathode such as $Co_3O_4$.

The anode metal used in the electrochemical cell of the invention comprises an anode active metal consisting of an alkaline earth metal, i.e., magnesium, calcium, strontium, or barium. It may be advantageous to use the anode metal in the form of an alloy with at least one other metal, for instance, a metal chosen from the metals belonging to groups I$a$, II$a$, II$b$, and III$b$ of the Periodic Table of the Elements.

The cathode active material is generally a substance capable of accepting electrons to form an intercalated structure by cathodic reduction and is characterized in that the cathode active material crystal structure has vacancies making it capable of accommodating, as an intercalated species, an ionized form of the metal from which the anode is formed. Thus the cathode can be characterized in that the active cathode material contains an intercalated species in a host structure which consists essentially of a transition metal chalcogenide selected from the group consisting of $Co_3O_4$, $WS_2$, $ZrS_2$, $MoSi_2$, and $Mn_3O_4$.

Where the cathode is not sufficiently capable of conducting electrons by itself, the cathode can be made electrically conducting by using an auxiliary conducting substance such as graphite or carbon. The cathode can be formed of powdered transition metal chalcogenides, as recited above, and a binder which is inert to the electrolyte such as polytetrafluoroethylene. In forming the cathode, the powdered materials, including a suitable proportion of binder, are formed into the anode structure by compressing the powdered materials, and heating if necessary in order to flux the binder. Preferred cathodes comprise cathode active metals selected from the group consisting of $Co_3O_4$, and $ZrS_2$. The most preferred cathode active compound is $Co_3O_4$, as this represents the preferred embodiment for attaining the high rate, high energy density electrochemical cell of the invention.

The electrolyte utilized in the electrochemical cell of the invention comprises water and an ionizable salt of an alkali metal. The electrolyte permits ionization of the anode metal and the migration of the anode metal ions between the anode and the cathode but is essentially incapable of solubilizing the transition metal chalcogenide cathode. A novel feature of the electrolyte utilized in the electrochemical cell of the invention is the fact that the electrolyte is utilized at a pH of about 1 to about 5, preferably about 2 to about 4, and most preferably about 3 so as to avoid the formation of a thick passivation layer or film on the surface of the alkaline earth metal anode. The formation of the passivation layer occurs most readily when the pH of the electrolyte is about neutral. The passivation film is solubilized in both acid and alkaline media. Upon the formation of a passivation film on the anode, the rate of penetration through the film becomes extremely slow since it is dependent upon the rate of diffusion of the electrolyte through the passivation film. Because of the above mechanism, when an alkaline earth metal such as magnesium or a magnesium alloy is used as an anode with an electrolyte which is aqueous and essentially neutral there is shown a reduction of cell performance as a result of reduced electrolyte solubility or penetration at the surface of the anode. In order to avoid a reduction in cell performance at neutral pH, the electrolyte utilized in the electrochemical cell of the invention is utilized at an acid pH as set forth above. Should the pH of the electrolyte rise above 5, in an electrochemical cell of the invention utilizing a magnesium anode, magnesium hydroxide will form upon the surface of the anode, reducing the current density of the cell. Suitable ionizable salts which are useful to adjust and/or maintain the pH of the electrolyte utilized in the electrochemical cell of the invention are acidic metal halides such as aluminum trichloride, niobium pentachloride, and molybdenum trichloride.

The ionizable salts utilized in the aqueous electrolyte of the electrochemical cell of the invention are those alkali metal or alkaline earth metal salts providing high conductivity, for instance, a salt of an alkali metal, or an alkaline earth metal tetrahaloborate or perhalate, such as lithium tetrafluoroborate, magnesium tetrafluoroborate, lithium perchlorate, and magnesium perchlorate. The choice of the ionizable salt is not critical providing it is capable of high conductivity and the salt is chemically inert with respect to the cathode utilized in the electrochemical cell of the invention. The concentration of the salt is about 1 to 2 molar and is not critical, the concentration being selected so as to compensate for the intrinsic conductivity of the salt, the salts showing lesser conductivity being used at the higher molar concentration and those showing high conductivity being utilized at the lower molar concentration. While any of the complex alkali metal or alkaline earth metal halide or perchlorate salts are useful as ionizable salts in the electrolyte of the electrochemical cell of the invention, the preferred ionizable salts are magnesium perchlorate and magnesium tetrafluoroborate when the anode is an alkaline earth metal, most preferably when the anode is magnesium.

The following examples illustrate the various aspects of the invention but are not intended to limit its scope. Where not otherwise specified throughout this specification and claims, temperatures are given in degrees centigrade and parts, percentages, and proportions are by weight.

EXAMPLE 1

A cell is constructed as shown in the drawing of FIG. 1 employing magnesium as the anode material and $Co_3O_4$ as the cathode material. The electrolyte is an aqueous solution of magnesium tetrafluoroborate at a concentration of about 1.0 to 2.0 molar. The electrolyte solution is prepared by mixing magnesium tetrafluoroborate in a 2 molar concentration in water at ambient temperature. The electrolyte is placed in the cell which is surrounded by container 4 as shown in FIG. 1. A switch (not shown) in the figure is closed, causing magnesium ions from the electrolyte to intercalate into the $Co_3O_4$ cathode to produce current. The results for the electrochemical cell of this example are shown in the graph of FIG. 2 which indicate the range of current density and the open circuit voltage for the electrochemical cell of this embodiment of the invention. This cell has a capacity of 225 milliampere hours per gram of cathode material.

EXAMPLE 2 control, forming no part of this invention

An electrochemical cell is constructed in accordance with the details of construction provided in example 1 with the exception that the cathode is manganese dioxide. Such a cell is capable of intercalation of magnesium ions at the manganese dioxide cathode in view of the fact that the free energy to form an intercalate is less than the free energy required for a disproportionation reaction, namely:

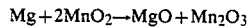

$$Mg + 2MnO_2 \rightarrow MgO + Mn_2O_3$$

Thus the free energy for the disproportionation reaction indicated above is minus 125 kilocalories per mole while the free energy to form an intercalate is minus 118 kilocalories per mole. Thus intercalate formation is prohibited. Instead, the manganese dioxide will react with the electrolyte to form MgO and $Mn_2O_3$. Other examples of inorganic oxides and disulfides which are incapable of intercalating an alkaline earth metal such as magnesium are illustrated in Table 1 below.

TABLE I

Examples of Inorganic Oxides and Disulfides Which do not Intercalate Mg

| Host | Structure | Free Energy −Kcal/mole Disproportion | Free Energy −Kcal/mole Intercalation |
|---|---|---|---|
| $VO_2$ | Rutile | 90 | 90 |
| $CrO_2$ | Rutile | 127.7 | 127.7 |
| $MnO_2$ | Rutile | 125 | 118 |
| $Fe_3O_4$ | Spinel | 75 | 74 |
| $MoO_2$ | Rutile | 75 | 75 |
| $SnO_2$ | Rutile | 73 | 73 |
| $ReO_3$ | $MoO_3$ type | 92.4 | 92.4 |
| $ReO_2$ | Rutile | 92.4 | 92.4 |

TABLE I-continued

Examples of Inorganic Oxides and Disulfides Which do not Intercalate Mg

| Host | Structure | Free Energy −Kcal/mole Disproportion | Free Energy −Kcal/mole Intercalation |
|---|---|---|---|
| $Bi_2O_3$ | $Mn_2O_3$ type | 95.6 | 95.6 |
| $MoS_2$ | Hex. | 77 | 77 |
| $NbS_2$ | Hex. | 57.8 | 57.8 |

The cell of the invention can be utilized in all applications requiring disposable high rate batteries, i.e., torpedo batteries, emergency radio operations, remote power sources, and tank backup batteries.

While this invention has been described with reference to certain specific embodiments, it will be recognized by those skilled in the art that many variations are possible without departing from the scope and spirit of the invention and it will be understood that it is intended to cover all changes and modifications of the invention disclosed for the purpose of illustration which do not constitute departures from the spirit and scope of the invention.

The embodiments of the invention in which an exclusive privilege or property is claimed are defined as follows:

1. In an electric current producing primary electrochemical cell containing an alkaline earth metal anode active material, a cathode, and an aqueous electrolyte containing an ionizable salt, the improvement comprising using a cathode active material capable of intercalating ions of said anode active material and an aqueous electrolyte having a pH of about 1 to about 5 and essentially nonreactive with said cathode.

2. The cell of claim 1 wherein said anode active material comprises magnesium or calcium or an alloy thereof, said cathode active material comprises at least one transition metal chalcogenide selected from the group consisting of $Co_3O_4$, $WS_2$, $ZrS_2$, $MoSi_2$, $Mn_3O_4$, and wherein said aqueous electrolyte comprises an ionizable salt of an alkali metal or an alkaline earth metal.

3. The cell of claim 2 wherein said cathode active material comprises at least one transition metal chalcogenide selected from the group consisting of $Co_3O_4$, and $ZrS_2$ and wherein said ionizable salt comprises at least one of a tetrahaloborate or perhalate salt of an alkali metal or an alkaline earth metal.

4. The cell of claim 3 wherein said cathode active material comprises $Co_3O_4$ and said ionizable salt comprises $Mg(BF_4)_2$, $Mg(ClO_4)_2$, or mixtures thereof.

5. The cell of claim 4 wherein said electrolyte comprises said ionizable salt at a concentration of about 1.0 to about 2.0 molar.

6. The cell of claim 5 wherein said electrolyte comprises an acidic metal halide salt capable of adjusting and/or maintaining the pH of said electrolyte at about 2 to about 4.

7. The cell of claim 6 wherein the acidic metal halide comprises an aluminum halide.

8. The cell of claim 7 wherein said acidic metal halide comprises aluminum trichloride.

9. A process for producing electric current at a high rate with high energy density at ambient temperature in a primary electrochemical cell comprising an alkaline earth metal anode active material; a cathode active material capable of intercalating ions of said anode active material, and an aqueous electrolyte comprising an ionizable salt, said process comprising: operating said cell at pH of about 1 to about 5, at a temperature of about 20° C. to 100° C., and wherein said cell exists in a dry or unactivated state until needed; activation being initiated by the addition of said electrolyte.

10. The process of claim 9 wherein said anode active material comprises magnesium or calcium, said cathode active material comprises at least one transition metal chalcogenide selected from the group consisting of $Co_3O_4$, $WS_2$, $ZrS_2$, $MoSi_2$, $Mn_3O_4$, and wherein said ionizable salt comprises at least one of a tetrahaloborate or perhalate salt of an alkali metal or an alkaline earth metal.

11. The process of claim 10 wherein said cathode comprises at least one cathode active material selected from the group consisting of $Co_3O_4$ and $ZrS_2$ and wherein said ionizable electrolyte salt comprises an alkali metal or alkaline earth metal tetrafluoroborate or perchlorate, or mixtures thereof.

12. The process of claim 11 wherein said ionizable salt is present in said electrolyte at a concentration of about 1.0 to about 2.0 molar and said pH is about 2 to about 4.

13. The process of claim 12 wherein said electrolyte comprises an acidic metal halide to adjust and/or maintain said pH.

14. The process of claim 13 wherein said acidic metal halide comprises aluminum trichloride.

* * * * *